(12) United States Patent
Zell et al.

(10) Patent No.: US 7,813,868 B2
(45) Date of Patent: Oct. 12, 2010

(54) METHOD AND DEVICE FOR OPERATING A DRIVE UNIT

(75) Inventors: Helmut Zell, Ulm (DE); Nikolas Poertner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 858 days.

(21) Appl. No.: 11/784,380

(22) Filed: Apr. 6, 2007

(65) Prior Publication Data

US 2007/0240916 A1    Oct. 18, 2007

(30) Foreign Application Priority Data

Apr. 7, 2006   (DE) .................. 10 2006 016 818

(51) Int. Cl.
*F02D 41/00*  (2006.01)
*B62D 57/00*  (2006.01)
*F02D 29/02*  (2006.01)

(52) U.S. Cl. ..................................... 701/112

(58) Field of Classification Search .............. 701/112, 701/115, 51; 123/319; 477/34, 16, 115
See application file for complete search history.

(56) References Cited

U.S. PATENT DOCUMENTS 7,367,864 B2 *  5/2008  Jung et al. ................. 477/34
7,698,050 B2 *  4/2010  Ludwig et al. ............. 701/112

FOREIGN PATENT DOCUMENTS

JP          2007-278293 A  * 10/2007

* cited by examiner

*Primary Examiner*—Hieu T Vo
(74) *Attorney, Agent, or Firm*—Kenyon & Kenyon LLP

(57) ABSTRACT

A method and a device for operating a drive unit, in particular of a vehicle, are provided, which allow for an adaptation of losses of an output variable of the drive unit, in particular of a torque, which is precise and which restricts as little as possible a request to shut down the drive unit. For this purpose, the losses are adapted during at least one operating phase, in particular an idling operating phase, of the drive unit. With the conclusion of a successful adaptation, a shutdown of the drive unit is enabled.

26 Claims, 3 Drawing Sheets

METHOD AND DEVICE FOR OPERATING A DRIVE UNIT

FIELD OF THE INVENTION

The present invention relates to a method and a device for operating drive unit.

BACKGROUND INFORMATION

Methods and devices for operating a drive unit, in particular of a vehicle, in which losses of an output variable of the drive unit, in particular of a torque, are adapted during at least one operating phase, in particular an idling operating phase, of the drive unit, are known for example from the not yet prepublished German patent application having the file number DE 10 2006 005 701.5 (which is not prior art).

SUMMARY OF THE INVENTION

By contrast, the method according to the present invention and the device according to the present invention for operating a drive unit having the features of the independent claims have the advantage that, with the conclusion of a successful adaptation, a shutdown of the drive unit is enabled. In this manner, the drive unit may be shut down even in an operating phase in which previously the losses of the output variable were successfully adapted. The loss adaptation and the shutdown of the drive unit may thus be coordinated with each other in one and the same operating phase and are no longer in contradiction to each other.

The measures set forth herein make possible advantageous further developments and improvements of the method as described herein.

It is particularly advantageous if a successful adaptation is detected when the adaptation of the losses has attuned to a stationary target value. This represents a particularly simple and inexpensive possibility for detecting a successful adaptation.

It is furthermore advantageous if, once the shutdown of the drive unit is enabled, a new adaptation of the losses is blocked. In this manner, an adaptation of the losses is prevented while the shutdown of the drive unit is enabled. In this manner also a conflict between a request to shut down the drive unit and a request for a new adaptation of the losses is avoided.

It is furthermore advantageous if the enabling of the shutdown of the drive unit occurs at least for the operating phase in which the successful adaptation was performed. In this manner it first becomes possible at all to allow also for the drive unit to be shut down in the operating phase, in which the successful adaptation was performed, following the conclusion of the successful adaptation. The duration of a blockade of the locking of the drive unit in such an operating phase can thus be minimized. This is advantageous particularly in hybrid drive units, which include a combustion engine and an electric motor, because there, in comparison to a pure combustion engine, the combustion engine is to be shut down much more frequently and thus a lot fewer idling phases exist in which the combustion engine is running. The same is true for start-stop drive units for driving vehicles, which shut the drive unit down when the vehicle is at a standstill rather than switching on the idling operating state. In both cases, enabling the shutdown of the drive unit at the conclusion of a successful adaptation allows for a shutdown of the drive unit, in particular of the combustion engine, even in operating phases, in particular in the idling operating phases, which are provided for carrying out the adaptation of the losses.

Another advantage results if the enabling of the shutdown of the drive unit occurs at least by the end of the driving cycle in which the successful adaptation was performed. In this manner the number of those operating phases of the drive unit, which are intended for the adaptation of the losses, is minimized, without this substantially impairing the accuracy of the current adaptation result. To this extent one can also speak of an optimization of the number of operating phases of the drive unit provided for the adaptation of the losses.

This can be minimized or optimized even further if the enabling of the shutdown of the drive unit following a successful adaptation in a driving cycle of the drive unit occurs at least by the end of a predefined number of subsequent driving cycles of the drive unit.

It is advantageous in this regard if the predefined number is determined as a function of a change of internal losses over time, in particular as a function of a change of the viscosity of the engine oil. In this manner it is possible to ensure that the adaptation result essentially remains effective until the end of the predefined number of subsequent driving cycles of the drive unit.

It is furthermore advantageous if a shutdown of the drive unit is blocked during the adaptation. This ensures that an adaptation of the losses can be successfully concluded in an operating phase of the drive unit provided for this purpose.

It is particularly advantageous if the blocking of the adaptation of the losses is lifted when a change of state of a load or +ancillary component is detected. This ensures that the adaptation of the losses can be updated as quickly as possible following a change of state of a load or ancillary component.

Another advantage results if at least two past adaptation results for different losses, which differ in at least one loss source, are compared to each other and the portion of the adaptation associated with the at least one loss source is ascertained as a function of the result of the comparison. In this manner, a targeted torque loss compensation is made possible solely based on the knowledge of a connected loss source.

An exemplary embodiment of the present invention is represented in the drawing and explained in greater detail in the following description.

DETAILED DESCRIPTION

Figure 1:
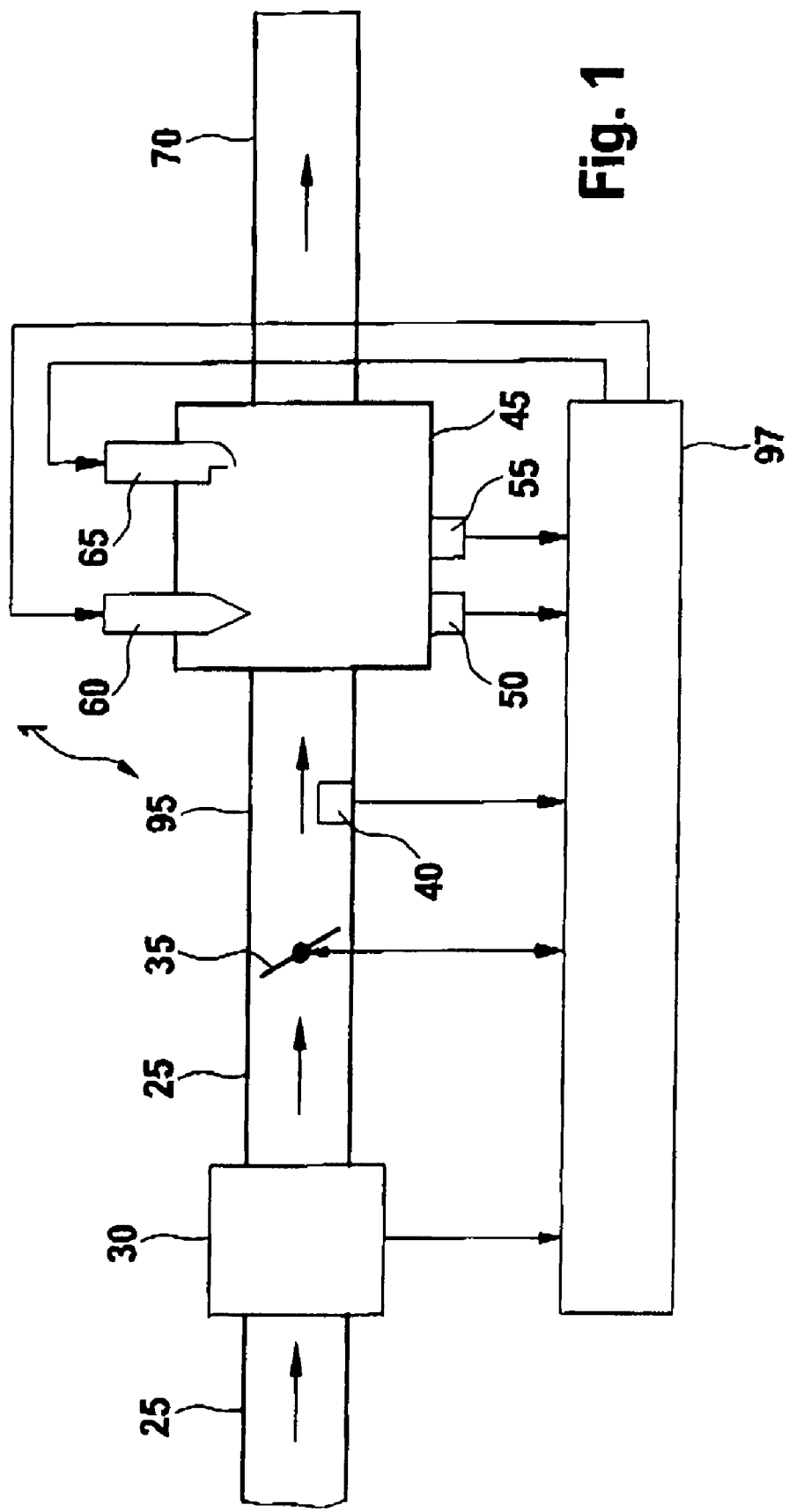
FIG. 1 shows a block diagram of a drive unit in the form of an internal combustion engine.

In FIG. 1, 1 indicates a drive unit. Drive unit 1 includes an internal combustion engine 45, which has fresh air supplied to it via an air supply 25. Internal combustion engine 45, for example, may take the form of a spark-ignition engine or a diesel engine. In the following, it is assumed by way of example that combustion engine 45 takes the form of a spark-ignition engine. The flow direction of the fresh air in air supply 25 is indicated in FIG. 1 by arrows. A throttle valve 36 is situated in air supply 25, the position of which influences the air mass flow to combustion engine 45'. The position of throttle valve 35 is set by an engine control unit 97. In the case where drive unit 1 drives a vehicle, engine control unit 97 can set the position of throttle valve 35 as a function of the position of an accelerator pedal in a manner known to one skilled in the art.

Throttle valve 35 further includes a position feedback device not shown explicitly in FIG. 1, for example in the form of a throttle valve potentiometer, which measures the position of throttle valve 35 and transmits a corresponding measuring signal to engine control unit 97. Upstream of throttle valve 35, an air mass flow sensor 30 is optionally situated in air supply 25. Air mass flow sensor 30, for example, may take the form of a hot film air mass flow sensor or an ultrasonic air mass flow sensor and measures the air mass flow supplied to combustion engine 45 via air supply 25. A corresponding measuring signal is transmitted by air mass flow sensor 30 to engine control unit 97.

Air mass flow sensor 30 is provided alternatively or additionally to throttle valve potentiometer. Additionally or alternatively to the throttle valve potentiometer or to air mass flow sensor 30, a pressure sensor 40 is situated downstream of throttle valve 35 in an induction pipe 95 of drive unit 1, which measures the pressure in induction pipe 95 and transmits a corresponding measuring signal to engine control unit 97. In this instance, the section of the air supply located downstream from throttle valve 35 is referred to as the induction pipe. A combustion chamber of combustion engine 45 not shown in detail in FIG. 1 is supplied with fuel via an injection valve 60. For this purpose, injection valve 60 is controlled by engine control unit 97, for example, for setting a predefined air/fuel mixture ratio.

In the case of a diesel engine, engine control unit 97 can control injection valve 60 also as a function of the accelerator pedal position for injecting an appropriate fuel quantity when drive unit 1 drives a vehicle. Furthermore, in the case of the combustion engine 45 in the form of spark-ignition engine, a spark plug 65 is provided, which ignites the air/gas mixture present in the combustion chamber of combustion engine 45. In this instance, spark plug 65 is controlled by engine control unit 97. The control may be used to set a predefined torque reserve or to heat up a catalytic converter (not shown in FIG. 1) in an exhaust branch 70 of drive unit 1.

The exhaust gas formed in the combustion chamber of combustion engine 45 in the combustion of the air/fuel mixture ratio is discharged into exhaust branch 70. In a manner known to one skilled in the art, a speed sensor 55 in the region of combustion engine 45 ascertains the speed of combustion engine 45 and transmits a corresponding measuring signal to engine control unit 97. Furthermore, a temperature sensor 50 is optionally provided as well, which measures a temperature of drive unit 1, in particular of combustion engine 45, and transmits a corresponding measuring signal to engine control unit 97. For this purpose, the temperature of combustion engine 45 may be measured by temperature sensor 50, for example, as the engine oil temperature or as the coolant temperature.

For controlling the control variables for setting the position of throttle valve 35, of the injection quantity and the start of injection of injection valve 60 as well as of the ignition firing point of spark plug 65 it is necessary for engine control unit 97 to know the losses of an output variable of drive unit 1. The output variable of drive unit 1 may be, for example, a torque or a power output or a variable derived from the torque and/or power output. In the following, it is assumed by way of example that the output variable is a torque, in particular the torque output by combustion engine 45.

Additional components of the drive unit such as, for example, an electric motor in the case of a hybrid drive concept are not shown in FIG. 1 for reasons of clarity and are also not absolutely necessary for understanding the exemplary embodiment and/or exemplary method of the present invention and for its function, even if the subsequently described method according to the present invention and the subsequently described device according to the present invention are particularly suited for such a hybrid drive concept, since such a hybrid drive concept or also a start-stop drive concept have only few or no idling operating phases in comparison to a conventional drive unit, which exclusively comprises a combustion engine as drive engine.

The losses of the torque of the drive unit, which are also referred to as torques losses in the following, essentially fall into two different groups, that is, the external torques losses and the internal torques losses. The external torque losses arise by switching on ancillary components such as air conditioning, servo units, car radio etc. The internal torque losses arise, for example, due to engine friction and charge exchange losses. The external torque losses can be specified, for example, by the manufacturer of the ancillary components as a function of the respective operating point of drive unit 1, in particular with respect to the engine speed and engine load, and can be taken into account with the aid of a precontrol.

For this purpose, the engine load may be ascertained in a manner known to one skilled in the art, for example, from the injected fuel quantity or the air mass flow, in particular in the form of the combustion chamber charge. Due to aging effects, wear or abrasion of the ancillary components, however, the external torque losses are subject to change and must therefore be corrected. Correspondingly, the internal torque losses are subject to fluctuations, which must also be compensated in order to be able to take the current torque losses into account as precisely as possible in controlling the drive unit. The fluctuations of the internal torque losses result, for example, from different engine oil qualities with respect to engine friction or with respect to different charge exchange losses as a function of the current induction pipe pressure, of the current throttle valve position or of the current air mass flow.

Thus when closing throttle valve 35, for example, the induction pipe pressure decreases in the direction of producing a greater underpressure, which causes higher charge exchange losses. Until now, the correction or adaptation of the torque losses, that is, both the internal as well as the external torque losses, was carried out during an idling operating state of drive unit 1 while the engine is warm and the vehicle is standing. This means that hitherto there were no idling operating states or idling operating phases of the drive unit without active adaptation of the torque losses.

In the torque loss adaptation, a distinction is made between different adaptation ranges, which are determined by the current configuration of the drive unit or by the currently active torque losses. A first adaptation range may be mentioned as an example in which the engine is active and an air conditioning system is not active. In a second adaptation range, the engine and the air conditioning system are active.

In addition or as an alternative to the air conditioning system, further adaptation ranges may provide one or more additional active or inactive loads or ancillary components such as, for example, power steering system, car radio, electric windows, electric sliding roof, etc.

For drive systems or concepts, in which the idling operating state is set comparatively seldom, such as in the described hybrid drive systems or start-stop drive concepts for example, an adaptation of the torque losses during the idling operating phases of drive unit 1 is problematic.

The exemplary embodiment and/or exemplary method of the present invention therefore provides for a shutdown of drive unit 1 to be enabled when a successful adaptation of the losses of the drive unit has been completed during an operating phase suitable for this purpose, for example, an idling operating phase. This is suitable both for drive units, which include as drive engine merely combustion engine 45, as well as particularly also for the described hybrid drive systems and start-stop drive concepts.

Thus it is not necessary specifically to set idling operating phases of drive unit 1, for example when the vehicle is standing still and the engine is warm, in order to perform the torque loss adaptation, a shutdown of drive unit 1 being prevented in this idling operating phase. Rather, a shutdown of drive unit 1 is enabled even for an idling operating phase provided for a torque loss adaptation as soon as the adaptation has been successfully completed. Thus it is possible to reduce the use of an idling operating phase for torque loss adaptation to the required time minimum and to achieve a compromise between a request to adapt a torque loss on the one hand and a request to shut down the drive unit on the other hand.

Figure 2:
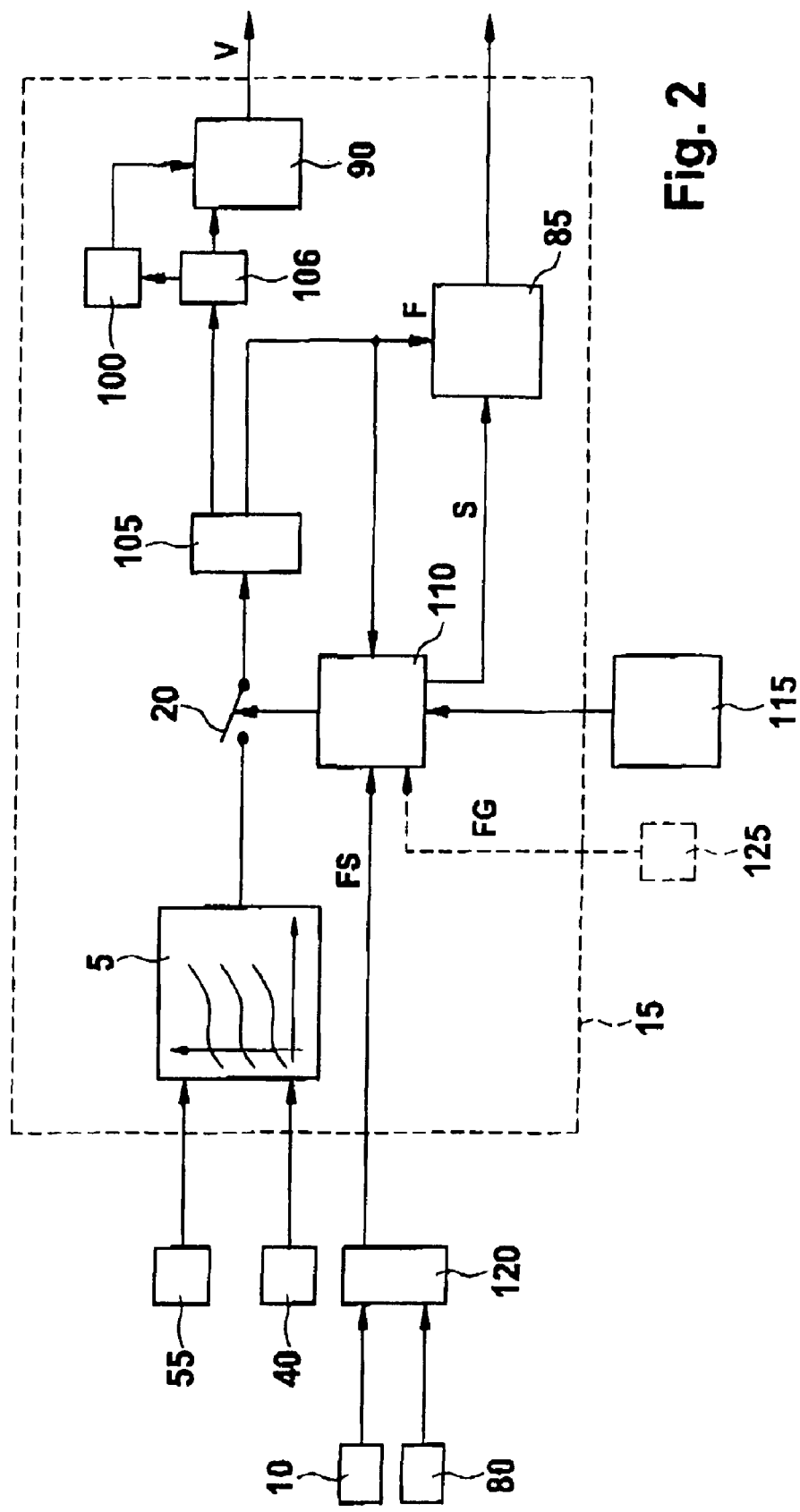
FIG. 2 shows a flow chart for explaining the method according to the present invention and the device according to the present invention.

FIG. 2 shows a device 15 according to the exemplary embodiment and/or exemplary method of the present invention in the form of a flow chart, which is also used to explicate the method according to the present invention. In this instance, device 15 may be implemented for example by way of software and/or hardware in engine control unit 97 or may be identical with the latter, additional components of the engine control unit, which are not required to understand the exemplary embodiment and/or exemplary method of the present invention, not being represented. Device 15 includes a characteristics map 5, which is supplied for example by induction pipe pressure sensor 40 with the measured induction pipe pressure and by speed sensor 55 with the measured engine speed as input variables. In this instance, the induction pipe pressure represents a performance quantity of drive unit 1 characterizing the engine load.

Alternatively, a different performance quantity of the drive unit than the performance quantity characterizing the engine load may be used as well, for example the air mass flow measured by air mass flow meter 30. From the engine speed and engine load alone it is possible to model the total torque loss of drive unit 1, that is, both the internal as well as the external torque losses, with the aid of characteristics map 5.

For this purpose, characteristics map 5 may be applied, for example, on a test stand and/or in driving tests in a manner known to one skilled in the art with the aid of the indications of the manufacturers regarding the operating point-dependent torque losses of the ancillary components. The value for the entire torque loss supplied by characteristics map 5 may thus be used as a precontrol value. This precontrol value is compared to the currently ascertained torque losses that are acting on the drive train, and, as a function of the result of the comparison, characteristics map 5 and thus the total torque loss ascertained by characteristics map 5 is adapted. Alternatively, the torque loss may also be ascertained and/or adapted in another manner known to one skilled in the art.

The total torque loss adapted in this manner at the output of characteristics map 5 can be supplied to a testing unit 105 via a controlled switch 20. Testing unit 105 checks whether the adaptation of the total torque loss was successfully concluded. This may be done in that a check is performed as to whether the adaptation of the losses or of the total torque loss has attuned to a stationary target value. This in turn may be determined by checking whether, within a predefined time period, the received adapted total torque loss changes in its absolute value by no more than a predefined tolerance value, it being possible to apply both the predefined time period as well as the predefined tolerance value in a suitable manner on a test stand and/or in driving tests.

For this purpose, the predefined time period should be sufficiently large and the predefined tolerance value sufficiently small so as to ensure that the adapted total torque loss has actually attuned to a stationary target value. On the other hand, the predefined time period should be chosen to be as small as possible and the predefined tolerance value as large as possible so as to be able to detect a successful conclusion of the adaptation as quickly as possible. Thus, a compromise must be achieved between the speed of the adaptation on the one hand and the precision of the adaptation on the other hand by the application of the predefined time period and the predefined tolerance value.

As soon as testing unit 105 in the described manner detects that the received adapted total torque loss is attuned to a stationary target value, it prompts a subsequent first memory 106 to supply its stored value, which corresponds to the adapted total torque loss ascertained in the previous adaptation, to a second memory 100 and to overwrite the latter, while first memory 106 is overwritten with the currently ascertained stationary attuned adapted total torque loss.

Both the content of first memory 106 as well as the content of second memory 100 are supplied to a comparator unit 90, which thus compares the currently ascertained attuned adapted total torque loss value to the attuned adapted total torque loss value ascertained in the previous adaptation and which outputs, as a function of the result of the comparison, for example of the difference, a corresponding comparison signal or comparison result V. In this context, however, the described comparison of the adaptation values is optional.

With the conclusion of the successful adaptation, testing unit 105 generates an enabling signal F and transmits this to a first enabling unit 85. With the reception of enabling signal F, for example in the form of a set pulse, first enabling unit 85 is prompted to enable a shutdown of drive unit 1. This occurs for example by a set pulse on the output of first enabling unit 85.

For this purpose, the output signal of first enabling unit 85 is set with the reception of enabling signal F, that is, for example, the positive edge of the set pulse of enabling signal F, and is set back only when first enabling unit 95 receives a blocking signal S. As long as the output signal of first enabling unit 85 is set, a switch-off or a shutdown of drive unit 1 is enabled and is implemented as soon as a shutdown request is made.

Enabling signal F is additionally supplied to a second enabling unit 110, which in turn triggers controlled switch 20. With the reception of enabling signal F, that is, for example, the positive edge of the corresponding set pulse, second enabling unit 110 causes controlled switch 20 to open with the consequence that the output of characteristics map 5 is disconnected from the input of testing unit 105 and thus so to speak the adaptation of the total torque loss is blocked.

Thus, with the enabling of the shutdown of drive unit 1, a new adaptation of the total torque loss is blocked as well.

Now, additionally, a load detection unit 120 is provided, which is connected to one or several loads or ancillary components 10, 80. In the present example, load detection unit 120 is connected to two loads 10, 80, for example, an air conditioning system and a servo unit. With the activation of a first load 10, for example, the air conditioning system, first load 10 sends a set signal to load detection unit 120, which is set back again with the deactivation of first load 10. Thus, load detection unit 120 interprets the positive edge of the set signal to the effect that first load 10 was activated, and load detection unit 120 detects the negative edge of the set signal to the effect that first load 10 was deactivated.

Accordingly, load detection unit 120 evaluates a set signal from a second load 80, for example a servo unit. If load detection unit 120 determines on the basis of the signals received from loads 10, 80 that one of the two loads 10, 80 was activated or deactivated, then it sends an enabling signal FS, for example in the form of a set pulse, to second enabling unit 110. With the reception of such an enabling signal FS, which can be detected for example on the basis of the positive edge of the set pulse, second enabling unit 110 determines that the adapted total torque loss may have changed and must therefore be newly adapted and for this purpose prompts controlled switch 20 to close so as to connect the output of characteristics map 5 to the input of testing unit 105, but not before second enabling unit 110 is informed by a detection unit 115 about the beginning of a new idling operating state.

Thus the adaptation is enabled on the basis of a change of state of a load or ancillary component 10, 80 in the form of its activation or deactivation, and a possibly existing blocking of the adaptation in the form of an open switch 20 is cancelled accordingly. If the adaptation was previously already enabled and switch 20 closed, then nothing changes in this regard on the basis of a change of state of one of loads 10, 80.

Detection unit 115 emits a set signal as long as drive unit 1 according to a first exemplary embodiment is in the idling operating state. In addition, detection unit 115 may check, for example, the state of an idling switch in a manner known to one skilled in the art but not shown in FIG. 2. If second enabling unit 110 receives the set pulse of enabling signal F of testing unit 105 when the output signal of detection unit 115 is set and thus during an idling operating state, then it emits no signal or the signal value zero on a second output, which is connected to first enabling unit 85. However, as soon as, following the reception of enabling signal F, second enabling unit 110 determines that the signal received from detection unit 115 was set back and thus the idling operating state was terminated, second enabling unit 110 sends a blocking signal S in the form of a set pulse to first enabling unit 85.

With the reception of blocking signal S, which discerned for example by detecting the positive edge of the associated set pulse in first enabling unit 85, first enabling unit 85 blocks the shutdown of drive unit 1. It is then impossible to shut down drive unit 1 until first enabling unit 85 again receives an enabling signal F from testing unit 105 in the form of the set pulse. Incidentally, second enabling unit 110 generates blocking signal S even when it receives enabling signal FS from load detection unit 120, namely, at the latest when second enabling unit 110 is informed by detection unit 115 about the beginning of a new idling operating state. In other words, a shutdown of drive unit 1 is blocked during the adaptation of the total torque loss. Due to blocking signal S of second enabling unit 110 as a result of the termination of the idling operating state following the successful conclusion of the adaptation of the total torque loss, the shutdown of drive unit 1 is thus enabled only for the idling operating phase in which the successful adaptation was performed.

Alternatively, however, there may be a provision according to a second exemplary embodiment for detection unit 115 to detect, not the existence of an idling operating state, but rather the existence of an active driving cycle. As long as the current driving cycle is active, that is, for example, as long as the ignition of the vehicle driven by drive unit 1 is not shut down, detection unit 115 generates a set signal on its output and sends it to second enabling unit 110. In this case, detection unit 115 is connected, for example, to an ignition switch or an ignition lock for detecting the active driving cycle.

As long as second enabling unit 110 receives the set signal of detection unit 115 following the reception of enabling signal F from testing unit 105, blocking signal S is not sent to first enabling unit 85. Only when, following the reception of enabling signal F, second enabling unit 110 detects that set signal of detection unit 115 has been set back and thus the end of the active current driving cycle, will it generate blocking signal S in the manner described in order to block the shutdown of drive unit 1. In this case the shutdown of drive unit 1 is enabled, following the reception of enabling signal F, not only until the end of the current idling operating state, but beyond that until the end of the current driving cycle, in which the successful adaptation was performed, but not beyond the end of this driving cycle. Only if the current driving cycle ends at the same time as the current idling operating state, in which the successful adaptation was performed, is it the case that no difference results for the duration of the enabling of the shutdown of drive unit 1 in comparison to the previous first exemplary embodiment.

If detection unit 115 according to the first exemplary embodiment detects a new subsequent idling operating state, then the output signal of detection unit 115 is set again. Thereupon second enabling unit 110 causes switch 20 to close and a blocking signal S to be produced to block the enabling of the shutdown of drive unit 1. Accordingly, for the second exemplary embodiment it is the case that second enabling unit 110 detects a subsequent driving cycle when there is a new setting of the output signal of detection unit 115. If then additionally in this subsequent driving cycle the idling operating stage is reached again, which can be detected by a detection unit as in the previously described first exemplary embodiment by second enabling unit 110, then second enabling unit 110 causes switch 20 to close and at the same time to produce blocking signal S for blocking the shutdown of drive unit 1.

For this purpose there may also be a provision in the second exemplary embodiment that the output signal of detection unit 115 is set with the occurrence of the first idling operating state in a driving cycle and is only set back at the end of this driving cycle. Thus the adaptation of the total torque loss is enabled for the first idling operating state in a driving cycle; at the same time the shutdown of drive unit 1 is blocked; following a successful adaptation the shutdown of drive unit 1 is enabled until the end of the current driving cycle; and the adaptation is blocked again.

In the case of a successful torque loss adaptation in a driving cycle, the adaptation of the total torque loss is thus not started again in the same driving cycle, that is, a cancellation of the blocking of the shutdown of drive unit 1 until the end of this driving cycle may be performed. This is then terminated in the manner described merely by an enabling signal FS detected in second enabling unit 110.

According to a third exemplary embodiment, building on the second exemplary embodiment there may now be a provision for detection unit 115 again to emit a set signal as long as the current driving cycle is active. In the third exemplary embodiment, second enabling unit 110 counts the driving cycles activated since the reception of enabling signal F on the basis of the received set signals of detection unit 115. Only when a predefined number of driving cycles was detected following the reception of enabling signal F and thus following a successful adaptation in a driving cycle of driving unit 1, will second enabling unit 110 cause blocking signal S to be emitted to first enabling unit 85 for blocking the shutdown of drive unit 1. With the subsequent reception of a new set signal of detection unit 115, switch 20 is then also closed and the adaptation thus enabled. The blocking of the shutdown of drive unit 1 by enabling unit 85 is then cancelled again with the reception of a new enabling signal F.

In this connection it is also possible to generate blocking signal S in all three exemplary embodiments synchronously or at the same time as the closing of switch 20 such that the shutdown of drive unit 1 must be blocked only during the adaptation. Thus the shutdown of drive unit 1 is enabled beyond the end of the idling operating state or the driving cycle, in which the successful adaptation was performed, in the third exemplary embodiment until at least the end of the predefined number of subsequent driving cycles. For this purpose, the predefined number may determined, for example, as a function of a change of the internal losses over time, in particular as a function of a change of the viscosity of the engine oil. In a warm engine, a change in the torque losses inside the engine, for example the friction torques, is primarily a function of the viscosity of the oil due to the piston movement and the engine bearing.

The viscosity of the oil in this instance is determined by the aging and dilution across the combustion chamber, which change the viscosity of the oil only slowly. A new torque loss adaptation with respect to the torque losses inside the engine is thus not necessary in every driving cycle. Rather, a certain number of driving cycles may pass before a new torque loss adaptation is requested. This number of driving cycles may be suitably applied on a test stand and/or in driving tests and corresponds to the predefined number. On the one hand, it should not be too high, in order to ensure that substantial changes in the torque losses inside the engine due to the change in the viscosity of the engine oil are indeed measured, while, on the other hand, it should not be too small, in order to keep the number of adaptations as low as possible and thus to block the shutdown of drive unit 1 as seldom as possible.

Additionally there may be a provision for the torque loss adaptation to be enabled in another operating phase of drive unit 1 than in the idling operating phase, for example in a phase of mixture adaptation or in a diagnostic phase. In this case, and as shown in FIG. 2 by dashed lines, a second detection unit 125 may optionally detect such an operating phase distinct from the idling operating phase, which is suitable for a torque loss adaptation, and send a corresponding enabling signal FG, for example in the form of a set pulse, to second enabling unit 110, which thereupon closes controlled switch 20 to torque loss adaptation without at the same time blocking a shutdown of drive unit 1. The latter because, in the phase considered here, the mixture adaptation or a diagnosis already blocks the shutdown of the drive unit. If a reproducible and stable state of the drive unit is set in this phase, then the torque loss adaptation may run parallel in this phase.

Following the conclusion of a successful torque loss adaptation initiated in this manner, enabling signal F is then generated in the manner described and controlled switch 20 is opened again. Furthermore, in the case of the third exemplary embodiment, with the reception of enabling signal F in second enabling unit 110 a counter for the driving cycles since the last successful torque loss adaptation is set back again and the driving cycles activated following the conclusion of the successful torque loss adaptation is counted anew and compared to the predefined number. Only when the predefined number of driving cycles has again been reached may a new torque loss adaptation be enabled and the shutdown of drive unit 1 be blocked, unless second enabling unit 110 previously receives an enabling signal FS or FG. The counter for the number of driving cycles is also set back again following a successful torque loss adaptation initiated by enabling signal FS.

If the adaptation of the total torque loss changes, for example due to the activation or deactivation of a load or ancillary component, then the associated adaptation portion of the total torque loss can be derived from comparison result V. Preconditions for an acceptable accuracy of the portion of the adapted total torque loss associated with the corresponding load or ancillary component, that is, the corresponding source of the torque loss, are comparable current accuracies of the adapted total torque losses that are compared to each other. These accuracies are all the more comparable, the shorter is the time interval between the associated adaptations or the lower is the number of driving cycles between the past adaptation events associated with the adapted total torque losses that are compared to each other.

The more time has elapsed since the two adaptation events at the time of the comparison of the associated adapted total torque losses, however, the lower will be the current accuracy of the adaptation results and the lower is also the current accuracy of the adaptation portion associated with the activated or deactivated source of the torque loss. Thus, the lower is the time interval or the number of driving cycles between two adaptation events associated with the adapted total torque losses that are compared to each other, the more meaningful will be the result of the comparison, and the fewer driving cycles the two adaptation events, which are associated with the adapted total torque losses that are compared to each other, date back in time, the more currently accurate will be the result of the comparison.

Figure 3:
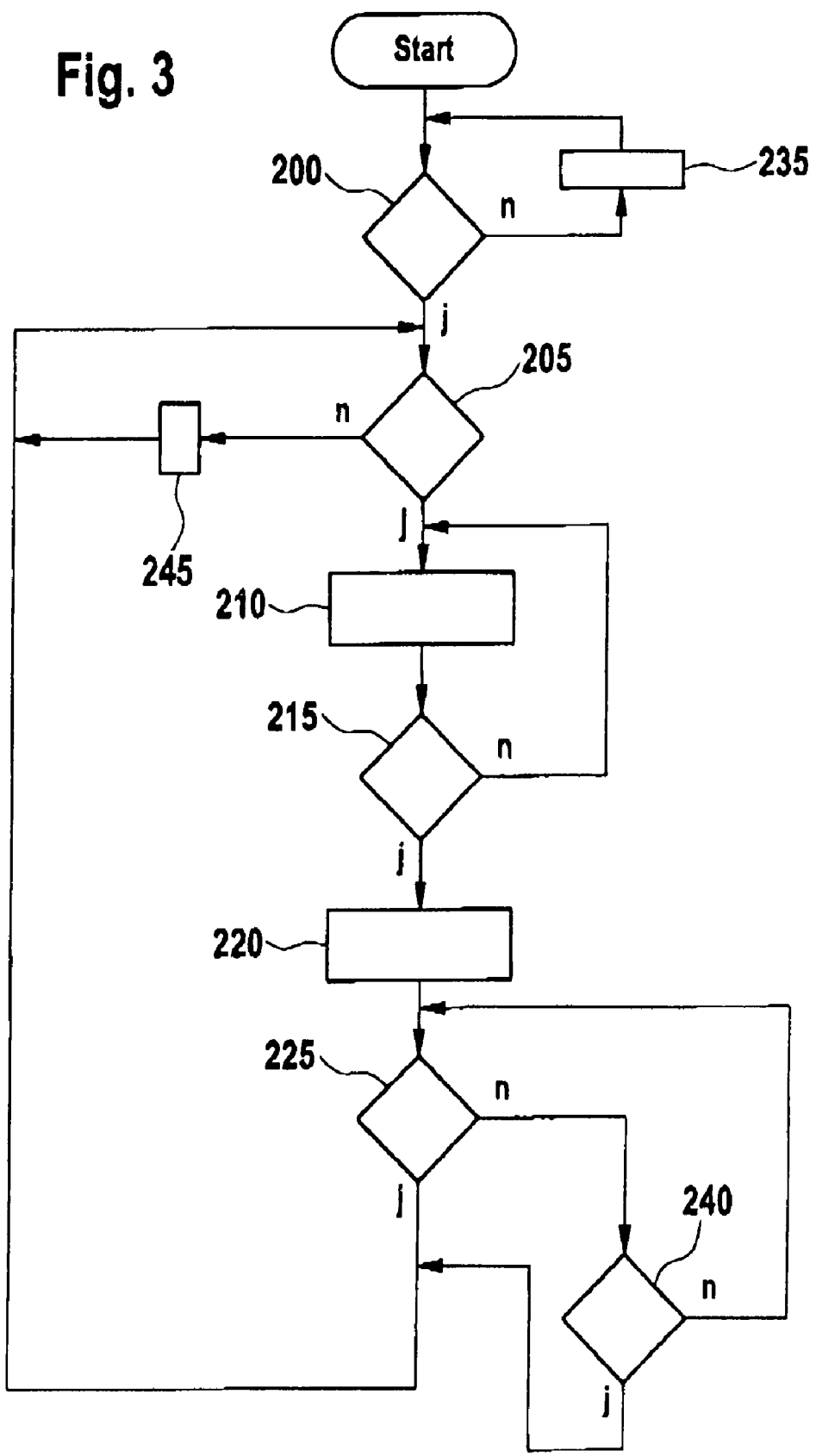
FIG. 3 shows a flow chart for an exemplary sequence of the method according to the present invention.

FIG. 3 shows a flow chart for an exemplary sequence of the method according to the present invention. Following the start of the program, second enabling unit 110 checks, on the basis of the signals of load detection unit 120, of second detection unit 125 and of first detection unit 115 in the manner described, whether the adaptation may be enabled. If this is the case, then the program branches to a program point 205; otherwise, it branches to a program point 235.

At program point 235, the program runs through a wait loop, in particular of the duration of one computing cycle. The program subsequently branches back to program point 200.

At program point 205, second enabling unit 110 checks on the basis of the signals of second detection unit 125 or of first detection unit 115, whether an operating state or an operating phase of drive unit 1, for example in the form of a mixture adaptation operating phase, a diagnostic operating phase or an idling operating phase, exists, which is suitable for performing the adaptation. If this is the case, then the program branches to a program point 210, otherwise the program branches back to program point 205 via a wait loop 245, in particular of the duration of one computing cycle.

At program point 210, second enabling unit 110 causes a closure of switch 20 and the generation of blocking signal S and thus the enabling of the adaptation and the blocking of the shutdown of drive unit 1. Subsequently, the program branches to a program point 215.

At program point 215, testing unit 105 checks whether the adaptation was successful, whether the adapted total torque loss has attuned to a stationary target value. If this is the case, then the program branches to a program point 220, otherwise the program branches back to program point 210.

At program point 220, testing unit 105 generates enabling signal F and optionally causes first memory 106 in the manner described to overwrite second memory 100 with the adapted total torque loss value of the previous adaptation, first memory 106 subsequently being overwritten with the current adaptation result and comparator unit 90 forming the current and the previous adaptation value for forming the comparison result or comparison signal V in the manner described.

Through enabling signal F, the shutdown of drive unit 1 is enabled via first enabling unit 85 and additionally switch 20 is opened by second enabling unit 110 and thus the adaptation is blocked. Subsequently, the program branches to a program point 225.

At program point 225, second enabling unit 110 checks whether an enabling signal FS was received from load detection unit 120 or an enabling signal FG was received from second detection unit 125. If this is the case, then the program branches to program point 205; otherwise the program branches to a program point 240.

At program point 240, second enabling unit 110 checks, on the basis of the signal received from first detection unit 115, whether in accordance with the first exemplary embodiment the current operating state or the current operating phase of drive unit 1, in which the successful adaptation was concluded, has ended; in accordance with the second exemplary embodiment, whether the current driving cycle, in which the successful adaptation was performed, has ended; or in accordance with the third exemplary embodiment, whether the predefined number of driving cycles since the driving cycle of the last successful adaptation has been reached. If this is the case, then the program branches to program point 205, otherwise the program branches back to program point 225.

The method according to the present invention and the device according to the present invention thus make it possible to determine precisely the internal and the external torque losses in the form of the adapted total torque loss and to do so at a minimal adaptation frequency, without significantly restricting the enabling of a shutdown of drive unit 1.

What is claimed is:

1. A device for operating a drive unit of a vehicle, comprising:
    an adaptation arrangement to adapt, during at least one operating phase, losses of an output variable of the drive unit; and
    an enabling arrangement to enable, with a conclusion of a successful adaptation, a shutdown of the drive unit.

2. The device of claim 1, wherein the output variable is a torque.

3. The device of claim 2, wherein the operating phase is an idling operating phase.

4. The device of claim 1, wherein the operating phase is an idling operating phase.

5. The device of claim 1, wherein a successful adaptation is detected when the adaptation of the losses has attuned to a stationary target value.

6. The device of claim 5, wherein the operating phase is an idling operating phase.

7. The device of claim 1, wherein with the enabling of the shutdown of the drive unit, a new adaptation of the losses is blocked.

8. The device of claim 1, wherein the enabling of the shutdown of the drive unit occurs at least for the operating phase in which the successful adaptation was performed.

9. The device of claim 1, wherein the enabling of the shutdown of the drive unit occurs at least by the end of a driving cycle in which the successful adaptation was performed.

10. The device of claim 1, wherein the enabling of the shutdown of the drive unit following a successful adaptation in a driving cycle of the drive unit occurs at least by the end of a predefined number of subsequent driving cycles of the drive unit.

11. The device of claim 10, wherein the predefined number is determined as a function of a change of internal losses over time.

12. The device of claim 1, wherein during the adaptation a shutdown of the drive unit is blocked.

13. The device of claim 1, wherein the blocking of the adaptation of the losses is cancelled if a change of state of at least one of a load component and an ancillary component is detected.

14. A method for operating a drive unit of a vehicle, the method comprising:
    adapting, during at least one operating phase, losses of an output variable of the drive unit; and
    enabling, with a conclusion of a successful adaptation, a shutdown of the drive unit.

15. The method of claim 14, wherein a successful adaptation is detected when the adaptation of the losses has attuned to a stationary target value.

16. The method of claim 14, wherein with the enabling of the shutdown of the drive unit, a new adaptation of the losses is blocked.

17. The method of claim 14, wherein the enabling of the shutdown of the drive unit occurs at least for the operating phase in which the successful adaptation was performed.

18. The method of claim 14, wherein the enabling of the shutdown of the drive unit occurs at least by the end of a driving cycle in which the successful adaptation was performed.

19. The method of claim 14, wherein the enabling of the shutdown of the drive unit following a successful adaptation in a driving cycle of the drive unit occurs at least by the end of a predefined number of subsequent driving cycles of the drive unit.

20. The method of claim 19, wherein the predefined number is determined as a function of a change of internal losses over time.

21. The method of claim 19, wherein the predefined number is determined as a function of a change in a viscosity of engine oil.

22. The method of claim 14, wherein during the adaptation a shutdown of the drive unit is blocked.

23. The method of claim 14, wherein the blocking of the adaptation of the losses is cancelled if a change of state of at least one of a load component and an ancillary component is detected.

24. The method of claim 14, further comprising:
    comparing at least two past adaptation results for different losses, which differ in at least one loss source; and
    ascertaining a portion of the adaptation associated with the at least one loss source as a function of a result of the comparing.

25. The method of claim 14, wherein the output variable is a torque.

26. The method of claim 14, wherein the operating phase is an idling operating phase.

* * * * *